(12) United States Patent
Koinke (10) Patent No.: US 10,488,872 B2
(45) Date of Patent: Nov. 26, 2019

(54) ACTUATING DRIVE DEVICE PROCESS VALVES

(71) Applicant: SAMSON AG, Frankfurt am Main (DE)

(72) Inventor: Janusz Koinke, Obershausen (DE)

(73) Assignee: SAMSON AG, Frankfurt am Main (DE)

( * ) Notice: Subject to any disclaimer, the term of this patent is extended or adjusted under 35 U.S.C. 154(b) by 36 days.

(21) Appl. No.: 16/024,884

(22) Filed: Jul. 1, 2018

(65) Prior Publication Data
US 2019/0011938 A1    Jan. 10, 2019

(30) Foreign Application Priority Data

Jul. 7, 2017 (DE) .................... 20 2017 104 079 U (51) Int. Cl.
*G05D 16/10* (2006.01)
*F16K 31/126* (2006.01)
(Continued)

(52) U.S. Cl.
CPC .......... *G05D 16/10* (2013.01); *F16K 31/126* (2013.01); *F16K 31/1262* (2013.01);
(Continued)

(58) Field of Classification Search
CPC ......... Y10T 137/7905; Y10T 137/7923; Y10T 137/7932; F16K 31/165; F16K 31/1262;
(Continued)

(56) References Cited

U.S. PATENT DOCUMENTS 1,340,832 A * 5/1920 Lanning ............... F16K 17/08
137/542
1,493,064 A * 5/1924 Brasington ............ F04B 49/02
137/492.5
(Continued)

FOREIGN PATENT DOCUMENTS

DE    2442587    4/1977
DE    8328350    11/1983
(Continued)

OTHER PUBLICATIONS

European Patent Office, European Search Report, dated Nov. 6, 2018, p. 1-8, Application No. 18181940.0, Applicant: Samson AG.
(Continued)

*Primary Examiner* — Marina A Tietjen
*Assistant Examiner* — Frederick D Soski
(74) *Attorney, Agent, or Firm* — Woodling, Krost and Rust (57) ABSTRACT

Actuating device for process valves (2) comprising a housing (22), comprising two housing parts (24, 26) and an actuating membrane member (20) sealingly mounted between housing parts (24, 26) and moveable in strokes which, on the one hand, forms together with the housing a pressurizeable working chamber (28) and, on the other hand, is loaded by at least one return spring (32) such that, in the unpressurized state, the actuating membrane member (20) is brought into a predefined position by means of the pretension of the return spring (32), wherein the actuating membrane member (20) is adapted to be connected to a valve shaft (18) connected to the valve body (16) of the process valve (2). A coupling installation (64) is provided having coupling parts (66, 68) arranged on both sides in the direction of the lifting movement of the actuating membrane member (20), which coupling parts are adapted to a connection (70) an the valve shaft (18) such that the connection
(Continued)

of the valve shaft (18) with the actuating membrane member (20) is carried out by a one-sided mounting, wherein the valve shaft (18) is adapted to be connected to each of the coupling parts (66, 68) of the coupling installation (64). On the actuating device (2) a distance measuring system (48) is arranged, which comprises a connection (72) which is adapted to be connected to each of the coupling parts (66, 68) of the coupling installation (64) by means of a one-sided mounting, wherein the coupling parts (66, 68) are constructed in analogy to the corresponding connections (70, 72) for selectively fastening of the valve shaft (18) or the distance measuring system (48) to the coupling installation (64).

4 Claims, 4 Drawing Sheets

(51) Int. Cl.
    *G05D 16/06*     (2006.01)
    *F16K 31/165*     (2006.01)
    *F16K 31/365*     (2006.01)
    *F16K 31/385*     (2006.01)

(52) U.S. Cl.
    CPC .......... *F16K 31/165* (2013.01); *F16K 31/365* (2013.01); *F16K 31/385* (2013.01); *G05D 16/063* (2013.01); *G05D 16/0636* (2013.01); *G05D 16/0655* (2013.01); *G05D 16/0663* (2013.01); *G05D 16/0683* (2013.01); *G05D 16/0691* (2013.01); *G05D 16/107* (2019.01); *Y10T 137/7905* (2015.04); *Y10T 137/7923* (2015.04); *Y10T 137/7932* (2015.04)

(58) Field of Classification Search
    CPC .... F16K 31/365; F16K 31/385; F16K 31/126; F16K 15/186; G05D 16/10; G05D 16/0636; G05D 16/107; G05D 16/063; G05D 16/0655; G05D 16/0663; G05D 16/0683; G05D 16/0691
    See application file for complete search history.

(56) References Cited

U.S. PATENT DOCUMENTS

| | | | | | |
|---|---|---|---|---|---|
| 1,618,815 | A * | 2/1927 | Cory | .............. | F25B 41/062 137/80 |
| 1,667,698 | A * | 4/1928 | Eggleston | ............. | F16K 17/087 137/529 |
| 1,773,726 | A * | 8/1930 | Deming | ................ | F16K 17/085 137/522 |
| 1,834,449 | A * | 12/1931 | Farmer | .................... | F16N 29/02 137/493 |
| 1,850,111 | A * | 3/1932 | Kelsey | .................... | B60S 5/043 137/224 |
| 1,854,750 | A * | 4/1932 | Lovekin | ................ | F16K 17/383 137/73 |
| 1,876,938 | A * | 9/1932 | Horne | ................ | F16K 11/0853 137/73 |
| 1,935,544 | A * | 11/1933 | De Lancey | .............. | B67D 7/16 417/278 |
| 1,937,565 | A * | 12/1933 | Griffiths | ................ | F24D 19/088 137/102 |
| 1,956,821 | A * | 5/1934 | Birch | ................ | G05D 16/0655 137/536 |
| 2,040,776 | A * | 5/1936 | Marvin | .................... | F16K 17/14 137/536 |
| 2,091,051 | A * | 8/1937 | Mesinger | ........... | G05D 16/0619 137/505.18 |
| 2,170,530 | A * | 8/1939 | Johnson | ................ | F02M 37/04 417/239 |
| 2,189,210 | A * | 2/1940 | Johnson | ................ | F02M 37/04 417/278 |
| 2,205,463 | A * | 6/1940 | Birch | ................ | F16K 17/085 137/522 |
| 2,219,441 | A * | 10/1940 | Carnes | ............... | G05D 16/0691 137/505.46 |
| 2,239,169 | A * | 4/1941 | Franck | ................... | F16K 17/16 137/536 |
| 2,251,244 | A * | 7/1941 | Stanley | ................... | E21B 34/08 166/370 |
| 2,335,829 | A * | 11/1943 | McBride | ............... | F16K 17/044 137/512 |
| 2,351,817 | A * | 6/1944 | Johnson | ................ | F02M 37/04 417/310 |
| 2,375,077 | A * | 5/1945 | Caserta | ................... | F16K 17/18 137/493.3 |
| 2,398,811 | A * | 4/1946 | Stacy | ..................... | F16K 31/126 137/112 |
| 2,423,281 | A * | 7/1947 | Aspelin | ................... | F16K 17/18 137/493.8 |
| 2,431,345 | A * | 11/1947 | Samiran | ............... | B64D 37/005 137/529 |
| 2,437,187 | A * | 3/1948 | Eshbaugh | ............... | F16K 24/00 137/81.1 |
| 2,501,121 | A * | 3/1950 | Caserta | ................... | F16K 17/18 137/493.8 |
| 2,586,147 | A * | 2/1952 | Caserta | ................ | B64D 37/005 137/536 |
| 2,588,527 | A * | 3/1952 | Holmes | ................... | F02C 7/232 137/529 |
| 2,590,656 | A * | 3/1952 | Schnebel | ................ | F16K 17/04 137/536 |
| 2,618,290 | A * | 11/1952 | Vliet | ...................... | F25B 41/062 137/510 |
| 2,623,535 | A * | 12/1952 | Morgan | ................ | B30B 15/161 137/114 |
| 2,669,245 | A * | 2/1954 | Walker | .................... | F02C 9/263 137/81.1 |
| 2,770,255 | A * | 11/1956 | Goddard | ................ | F16K 17/06 137/529 |
| 2,832,372 | A * | 4/1958 | Farris | .................... | F16K 17/087 137/528 |
| 2,839,076 | A * | 6/1958 | Mueller | ................ | F16K 17/085 137/469 |
| 3,152,607 | A * | 10/1964 | Lundeen | ................... | B67D 3/00 137/505.13 |
| 3,437,110 | A * | 4/1969 | Birdwell | ............... | F16K 17/082 137/528 |
| 3,561,468 | A * | 2/1971 | Sugden, Jr. | ......... | F16K 31/1262 137/269 |
| 3,570,542 | A * | 3/1971 | Otto | .................... | B01D 46/0075 137/628 |
| 3,576,193 | A * | 4/1971 | Rothfuss | ............. | G05D 16/0663 137/116.5 |
| 3,578,014 | A * | 5/1971 | Gachot | ............. | G05D 16/0619 137/115.15 |
| 3,586,037 | A * | 6/1971 | Zimmer | ............. | G05D 16/0663 137/505.18 |
| 3,599,658 | A * | 8/1971 | Kruzan | ............. | G05D 16/0683 137/116.5 |
| 3,601,157 | A * | 8/1971 | Milleville | ........... | F16K 31/1262 137/630.14 |
| 3,604,452 | A * | 9/1971 | Daniels | .................... | F16K 15/18 137/523 |
| 3,618,689 | A * | 11/1971 | German | ................ | F16K 17/34 137/462 |
| 3,623,506 | A * | 11/1971 | Bonner | ................ | F16K 17/22 137/613 |
| 3,625,247 | A * | 12/1971 | Dargatz | ............. | G05D 16/0655 137/493.2 |
| 3,625,479 | A * | 12/1971 | Hammon | ........... | G05D 16/0663 251/168 |
| 3,635,239 | A * | 1/1972 | Farrer | ..................... | F16K 17/32 137/461 |

(56) References Cited

U.S. PATENT DOCUMENTS

| | | | | |
|---|---|---|---|---|
| 3,642,021 A * | 2/1972 | Muller | ............... | F16K 11/00 137/114 |
| 3,648,732 A * | 3/1972 | Moreland, II | ........ | F16K 31/365 137/624.18 |
| 3,654,948 A * | 4/1972 | Nelson | ............... | G05D 16/0655 137/118.07 |
| 3,689,025 A * | 9/1972 | Kiser | ............... | F16K 7/16 251/25 |
| 3,696,830 A * | 10/1972 | Janu | ............... | F16K 31/385 137/209 |
| 3,699,998 A * | 10/1972 | Baranowski, Jr. | ............... | G05D 16/0663 137/327 |
| 3,706,320 A * | 12/1972 | Kalsi | ............... | F16K 31/365 137/487 |
| 3,707,985 A * | 1/1973 | Haase | ............... | F16K 31/126 137/495 |
| 3,708,998 A * | 1/1973 | Scherer | ............... | F16K 31/385 62/210 |
| 3,722,536 A * | 3/1973 | Hill | ............... | G05D 16/0683 137/505.46 |
| 3,730,215 A * | 5/1973 | Conery | ............... | F04D 9/02 137/494 |
| 3,732,889 A * | 5/1973 | Conery | ............... | F04D 9/006 137/498 |
| 3,739,810 A * | 6/1973 | Horan, Jr. | ............... | E03B 5/04 137/565.34 |
| 3,747,627 A * | 7/1973 | Christie | ............... | F16K 31/36 137/102 |
| 3,759,294 A * | 9/1973 | Kongelka | ............... | G05D 16/0663 137/882 |
| 3,762,436 A * | 10/1973 | Clayton | ............... | G05D 16/0663 137/505.35 |
| 3,773,071 A * | 11/1973 | Stang, Jr. | ............... | G05D 16/0655 137/484.8 |
| 3,794,062 A * | 2/1974 | AuWerter | ............... | F16K 31/365 137/488 |
| 3,806,081 A * | 4/1974 | Otto | ............... | F16K 31/385 251/22 |
| 3,811,467 A * | 5/1974 | Jones | ............... | A01J 5/048 137/494 |
| 3,812,877 A * | 5/1974 | Fleischhacker | .... | G05D 16/0663 137/505.42 |
| 3,865,137 A * | 2/1975 | Chvatal | ............... | F16K 31/365 137/613 |
| 3,874,404 A * | 4/1975 | Waight | ............... | F16K 17/20 137/493 |
| 3,882,900 A * | 5/1975 | Williams | ............... | F01P 11/14 137/625.34 |
| 3,884,446 A * | 5/1975 | Erickson | ............... | F16K 31/1262 251/61.4 |
| 3,892,255 A * | 7/1975 | Johnson | ............... | G05D 16/0683 137/116.5 |
| 3,892,258 A * | 7/1975 | Hendrick | ............... | F16K 17/20 137/461 |
| 3,921,966 A * | 11/1975 | Genbauffe | ............... | F16K 31/365 267/166 |
| 3,935,626 A * | 2/1976 | Genbauff | ............... | B23P 15/00 29/890.128 |
| 4,016,905 A * | 4/1977 | Marlatt, Sr. | ........ | G05D 16/0663 137/505.41 |
| 4,044,788 A * | 8/1977 | Crawford | ............... | G05D 16/0655 137/87.01 |
| 4,044,792 A * | 8/1977 | Kjaergaard | ............... | G05D 16/0655 137/505.22 |
| 4,050,670 A * | 9/1977 | Borg | ............... | F16K 31/145 251/14 |
| 4,064,894 A * | 12/1977 | Ludwig | ............... | F02P 5/106 137/116.5 |
| 4,111,222 A * | 9/1978 | Hassell | ............... | G05D 16/0663 137/116.5 |
| 4,149,559 A * | 4/1979 | Wormser | ............... | G05D 16/107 137/505.18 |
| 4,171,004 A * | 10/1979 | Cerrato | ............... | G05D 16/0663 137/115.14 |
| 4,182,366 A * | 1/1980 | Boehringer | ......... | A61M 16/208 128/205.24 |
| 4,190,071 A * | 2/1980 | Dean | ............... | E03C 1/106 137/115.16 |
| 4,206,901 A * | 6/1980 | Williams | ............... | A01G 25/16 137/902 |
| 4,226,259 A * | 10/1980 | Szekely | ............... | F16K 31/365 137/269 |
| 4,244,554 A * | 1/1981 | DiMauro | ............... | F16K 31/385 251/30.02 |
| 4,245,813 A * | 1/1981 | Grenier | ............... | F16K 31/385 251/32 |
| 4,251,050 A * | 2/1981 | McInerney | ............... | F02B 37/12 251/61 |
| 4,275,764 A * | 6/1981 | Baret | ............... | F16K 21/04 137/454.6 |
| 4,295,489 A * | 10/1981 | Arends | ............... | F16K 31/365 137/488 |
| 4,309,022 A * | 1/1982 | Reinicke | ............... | F16K 31/1221 251/297 |
| 4,363,463 A * | 12/1982 | Moon, Jr. | ............... | F16K 31/1262 251/214 |
| 4,370,997 A * | 2/1983 | Braithwaite | ............... | F16K 17/04 137/116.3 |
| 4,376,523 A * | 3/1983 | Goyen | ............... | F16K 31/385 251/145 |
| 4,418,535 A * | 12/1983 | Ecomard | ............... | F02B 37/183 60/602 |
| 4,469,124 A * | 9/1984 | Bronsky | ............... | F16K 31/1262 137/464 |
| 4,489,751 A * | 12/1984 | Acomb | ............... | G05D 16/0633 137/484.8 |
| 4,505,296 A * | 3/1985 | Field | ............... | F02M 69/54 137/454.2 |
| 4,603,832 A * | 8/1986 | Sjoquist | ............... | A01G 25/16 251/129.03 |
| 4,613,111 A * | 9/1986 | Paquet | ............... | F16K 31/1266 251/30.01 |
| 4,622,995 A * | 11/1986 | Gillingham | ........ | B01D 46/0068 137/204 |
| 4,632,143 A * | 12/1986 | McNeely | ............... | F16K 17/10 137/488 |
| 4,684,103 A * | 8/1987 | Baumann | ............... | F16K 31/1262 251/280 |
| 4,717,117 A * | 1/1988 | Cook | ............... | B60G 17/0528 251/331 |
| 4,719,940 A * | 1/1988 | Beavers | ............... | G05D 16/0663 137/505.39 |
| 4,725,038 A * | 2/1988 | Heneker | ............... | F16K 31/385 137/801 |
| 4,733,689 A * | 3/1988 | Osnas | ............... | A01G 25/16 137/494 |
| 4,741,359 A * | 5/1988 | Siebald | ............... | G05D 16/0663 137/505.42 |
| 4,752,445 A * | 6/1988 | Zell | ............... | A61L 2/24 251/61.2 |
| 4,766,762 A * | 8/1988 | Tsan | ............... | G01M 3/2876 73/40 |
| 4,783,046 A * | 11/1988 | Young | ............... | F16K 31/1262 251/61 |
| 4,817,664 A * | 4/1989 | Chang | ............... | G05D 16/0691 137/456 |
| 4,883,088 A * | 11/1989 | Herbst | ............... | F02M 69/54 137/510 |
| 4,915,127 A * | 4/1990 | Werley | ............... | G05D 16/0663 137/505.42 |
| 4,942,899 A * | 7/1990 | Vork | ............... | G05D 16/0655 137/454.5 |
| 4,966,183 A * | 10/1990 | Williamson, Jr. | ............... | G05D 16/0663 137/116.5 |

(56) References Cited

U.S. PATENT DOCUMENTS

| | | | | |
|---|---|---|---|---|
| 4,971,288 A * | 11/1990 | Tanner | F16K 31/1262 | 251/57 |
| 4,974,630 A * | 12/1990 | Chang | F16K 17/28 | 137/460 |
| 5,009,245 A * | 4/1991 | Esola | G05D 16/0683 | 137/116.5 |
| 5,048,751 A * | 9/1991 | DuBois | F01P 7/16 | 137/508 |
| 5,062,449 A * | 11/1991 | Woollums | G05D 16/02 | 137/116.5 |
| 5,065,788 A * | 11/1991 | McManigal | G05D 16/0655 | 137/505.11 |
| 5,103,861 A * | 4/1992 | Lin | G05D 16/0683 | 137/505.12 |
| RE33,928 E * | 5/1992 | Bruton | F16K 31/1262 | 12/94 |
| 5,131,425 A * | 7/1992 | Sturgis | G05D 16/0683 | 137/116.5 |
| 5,141,022 A * | 8/1992 | Black | G05D 16/0655 | 137/495 |
| 5,174,331 A * | 12/1992 | Steudler, Jr. | G05D 16/0683 | 137/505.46 |
| 5,211,205 A * | 5/1993 | Grant | F02M 69/54 | 123/457 |
| 5,217,043 A * | 6/1993 | Novakovic | F16K 31/385 | 137/460 |
| 5,234,026 A * | 8/1993 | Patterson | G05D 16/107 | 137/505.18 |
| 5,245,997 A * | 9/1993 | Bartos | A62B 9/022 | 128/201.28 |
| 5,275,203 A * | 1/1994 | Robinson | F02M 69/54 | 123/463 |
| 5,285,810 A * | 2/1994 | Gotthelf | B60K 15/03006 | 137/340 |
| 5,288,052 A * | 2/1994 | Black | F16K 31/1262 | 137/556.3 |
| 5,381,824 A * | 1/1995 | Wang | G05D 16/0636 | 137/505 |
| 5,402,820 A * | 4/1995 | Duffy | G05D 16/0683 | 137/505 |
| 5,427,143 A * | 6/1995 | Maracchi | F17D 1/04 | 137/312 |
| 5,443,083 A * | 8/1995 | Gotthelf | B60K 15/03006 | 137/340 |
| 5,452,741 A * | 9/1995 | Tomita | G05D 16/107 | 137/505.26 |
| 5,464,064 A * | 11/1995 | Weingarten | A62C 35/64 | 169/22 |
| 5,469,774 A * | 11/1995 | Kaspers | F16K 31/165 | 137/270 |
| 5,492,146 A * | 2/1996 | George | G05D 16/0655 | 137/505.41 |
| 5,511,582 A * | 4/1996 | Hudson | G05D 16/10 | 137/494 |
| 5,533,873 A * | 7/1996 | Kindl | F04B 49/225 | 137/529 |
| 5,584,318 A * | 12/1996 | Brandt | B01D 35/147 | 137/549 |
| 5,623,962 A * | 4/1997 | Danzy | F16K 17/04 | 137/469 |
| 5,634,627 A * | 6/1997 | Daido | F16K 41/10 | 251/335.3 |
| 5,647,397 A * | 7/1997 | Heiniger | F16K 31/1262 | 137/559 |
| 5,711,340 A * | 1/1998 | Gusky | G05D 16/0663 | 137/116.5 |
| 5,762,315 A * | 6/1998 | Eggleston | F16K 31/1228 | 251/61.4 |
| 5,829,473 A * | 11/1998 | Hajbi | F16K 31/126 | 137/315.28 |
| 6,015,134 A * | 1/2000 | Johnson | F16K 31/1262 | 137/556 |
| 6,026,850 A * | 2/2000 | Newton | G05D 16/0655 | 137/505 |
| 6,062,245 A * | 5/2000 | Berglind | G05D 16/0655 | 137/12 |
| 6,079,434 A * | 6/2000 | Reid | G05D 16/0655 | 137/14 |
| 6,170,519 B1 * | 1/2001 | Carroll | G05D 16/107 | 137/505.42 |
| 6,171,495 B1 * | 1/2001 | Drori | F16K 11/044 | 137/625.5 |
| 6,176,256 B1 * | 1/2001 | Nakajima | G05D 16/0402 | 137/505.12 |
| 6,192,912 B1 * | 2/2001 | Butler | F16K 27/0281 | 137/15.19 |
| 6,216,731 B1 * | 4/2001 | Frenkel | F16K 31/126 | 137/556 |
| 6,318,405 B1 * | 11/2001 | Brandt | G05D 16/0663 | 137/484.2 |
| 6,318,973 B1 * | 11/2001 | Sailer | F01C 21/10 | 137/536 |
| 6,321,772 B1 * | 11/2001 | Uehara | B65G 47/917 | 137/112 |
| 7,500,491 B2 * | 3/2009 | Welch | G05D 16/0658 | 137/505.41 |
| 8,087,428 B1 * | 1/2012 | Beswick | F16K 1/34 | 137/505.12 |
| 8,327,871 B1 * | 12/2012 | Franklin | G05D 16/0655 | 137/271 |
| 10,364,906 B1 * | 7/2019 | Cassidy | G05D 16/063 | |
| 2001/0009161 A1 * | 7/2001 | Berger | G05D 16/0663 | 137/116.5 |
| 2002/0083980 A1 * | 7/2002 | Nakajima | G05D 16/0663 | 137/505.41 |
| 2002/0096215 A1 * | 7/2002 | Bradley | F16K 3/08 | 137/505.11 |
| 2003/0102031 A1 * | 6/2003 | Igarashi | F16K 17/0433 | 137/469 |
| 2003/0164190 A1 * | 9/2003 | Ellero | G05D 16/0663 | 137/505.42 |
| 2003/0178063 A1 * | 9/2003 | Gagnon | F16K 31/1266 | 137/338 |
| 2004/0055646 A1 * | 3/2004 | Robinson | F02M 69/54 | 137/510 |
| 2004/0129907 A1 * | 7/2004 | Lovell | F16K 31/1262 | 251/61 |
| 2004/0173765 A1 * | 9/2004 | Hsi-Chun | F16K 7/17 | 251/30.02 |
| 2004/0211263 A1 * | 10/2004 | Wiesinger | F02M 37/0029 | 73/716 |
| 2004/0244839 A1 * | 12/2004 | Wynn, Jr. | F02M 69/54 | 137/510 |
| 2006/0065307 A1 * | 3/2006 | Schmidt | G05D 16/02 | 137/505.46 |
| 2006/0102236 A1 * | 5/2006 | Phillips | F16K 37/0008 | 137/557 |
| 2006/0162783 A1 * | 7/2006 | Valentin-Rumpel | F16K 31/126 | 137/377 |
| 2006/0185736 A1 * | 8/2006 | Cavagna | G05D 16/0683 | 137/505.12 |
| 2006/0213559 A1 * | 9/2006 | Haslam | F16K 31/34 | 137/414 |
| 2006/0260692 A1 * | 11/2006 | Pechtold | G05D 16/0672 | 137/505.42 |
| 2006/0267403 A1 * | 11/2006 | Newton | F16K 1/307 | 303/84.2 |
| 2007/0102047 A1 * | 5/2007 | Graham | G05D 16/0663 | 137/494 |
| 2007/0120080 A1 * | 5/2007 | Shinohara | F16K 31/1262 | 251/58 |
| 2007/0164560 A1 * | 7/2007 | McCarty | F16K 1/48 | 285/1 |
| 2007/0204915 A1 * | 9/2007 | Kimbara | G05D 16/10 | 137/495 |
| 2007/0228069 A1 * | 10/2007 | Onoe | B65D 88/703 | 222/14 |

(56) References Cited

U.S. PATENT DOCUMENTS

| | | | | |
|---|---|---|---|---|
| 2007/0272313 A1* | 11/2007 | Olds | | G05D 16/0402 137/613 |
| 2008/0054214 A1* | 3/2008 | Olberding | | F16K 31/1262 251/242 |
| 2008/0078460 A1* | 4/2008 | Roper | | G05D 16/0669 137/540 |
| 2008/0083462 A1* | 4/2008 | Smeller | | G05D 16/0663 137/505.42 |
| 2008/0149875 A1* | 6/2008 | Hoffmann | | F16K 1/523 251/285 |
| 2008/0173084 A1* | 7/2008 | Wiesinger | | F02M 37/0029 73/199 |
| 2008/0197310 A1* | 8/2008 | Gethmann | | F16K 1/523 251/205 |
| 2008/0257418 A1* | 10/2008 | Kranz | | G05D 16/0683 137/315.13 |
| 2008/0257420 A1* | 10/2008 | Faillat | | F16K 17/042 137/460 |
| 2008/0257421 A1* | 10/2008 | Kranz | | F16K 17/32 137/461 |
| 2008/0257427 A1* | 10/2008 | Zhang | | G05D 16/0683 137/535 |
| 2008/0258095 A1* | 10/2008 | Hawkins | | G05D 16/0683 251/321 |
| 2008/0258098 A1* | 10/2008 | Hawkins | | F16K 31/165 251/366 |
| 2008/0258099 A1* | 10/2008 | Hawkins | | G05D 16/0683 251/367 |
| 2008/0314462 A1* | 12/2008 | Nakamura | | F17C 13/04 137/614.02 |
| 2009/0020170 A1* | 1/2009 | Anderson | | B60C 23/003 137/492.5 |
| 2009/0071548 A1* | 3/2009 | Patterson | | G05D 16/103 137/497 |
| 2009/0145294 A1* | 6/2009 | Gethmann | | F16K 31/1262 92/94 |
| 2009/0146088 A1* | 6/2009 | Kleegrewe | | F04B 43/04 251/12 |
| 2009/0151797 A1* | 6/2009 | Nakamura | | G05D 16/0655 137/505 |
| 2009/0261281 A1* | 10/2009 | Mevius | | F16K 31/165 251/118 |
| 2009/0320935 A1* | 12/2009 | Yamamoto | | G05D 16/0663 137/505.39 |
| 2010/0035117 A1* | 2/2010 | Takeshita | | F16K 31/1262 429/412 |
| 2010/0050786 A1* | 3/2010 | Kiesbauer | | G05B 23/0256 73/862.583 |
| 2010/0092821 A1* | 4/2010 | Takeshita | | F16K 31/126 429/407 |
| 2010/0119912 A1* | 5/2010 | Takeshita | | F16K 31/1262 429/443 |
| 2010/0147400 A1* | 6/2010 | Hawkins | | F16K 17/105 137/484.4 |
| 2010/0180959 A1* | 7/2010 | Patterson | | G05D 23/19 137/334 |
| 2010/0180960 A1* | 7/2010 | Patterson | | G05D 16/0655 137/340 |
| 2010/0193716 A1* | 8/2010 | McCarty | | F16J 3/02 251/61 |
| 2010/0206401 A1* | 8/2010 | Niebel | | G05D 16/185 137/505.11 |
| 2010/0236635 A1* | 9/2010 | Tatarek | | A61M 16/12 137/14 |
| 2010/0237095 A1* | 9/2010 | Mussot | | B65D 83/44 222/3 |
| 2010/0269925 A1* | 10/2010 | Roper | | F16K 3/246 137/505.37 |
| 2010/0276614 A1* | 11/2010 | Patterson | | G05D 16/0663 251/12 |
| 2010/0305874 A1* | 12/2010 | Meier | | F15B 19/00 702/34 |
| 2010/0320410 A1* | 12/2010 | Mogi | | F25B 41/062 251/331 |
| 2010/0326533 A1* | 12/2010 | Mooney | | F16K 7/14 137/12 |
| 2011/0001070 A1* | 1/2011 | Wilke | | F16K 31/1262 251/129.03 |
| 2011/0118881 A1* | 5/2011 | Tai | | A01G 25/162 700/282 |
| 2011/0155250 A1* | 6/2011 | Nannan | | F15B 9/03 137/1 |
| 2011/0192999 A1* | 8/2011 | Wykle | | G05D 16/0683 251/129.01 |
| 2011/0240126 A1* | 10/2011 | Lymberopoulos | | F16K 31/1262 137/1 |
| 2011/0284102 A1* | 11/2011 | Schneider | | F16K 1/487 137/505.47 |
| 2011/0284791 A1* | 11/2011 | Vasquez | | F16K 31/1262 251/337 |
| 2012/0024082 A1* | 2/2012 | Kiesbauer | | F16K 37/0083 73/862.582 |
| 2012/0025114 A1* | 2/2012 | Lymberopoulos | | F16K 31/1262 251/12 |
| 2012/0048237 A1* | 3/2012 | Villaire | | F02M 37/0029 123/457 |
| 2012/0058409 A1* | 3/2012 | Maier | | F16K 31/126 429/444 |
| 2012/0111425 A1* | 5/2012 | Hawkins | | G05D 16/0683 137/489 |
| 2012/0234407 A1* | 9/2012 | Edwards | | G05D 16/0655 137/505 |
| 2012/0256115 A1* | 10/2012 | Maeda | | F02B 37/16 251/356 |
| 2012/0318377 A1* | 12/2012 | Vorotynets | | G05D 16/0663 137/315.01 |
| 2013/0000756 A1* | 1/2013 | Griffin, Jr. | | G05D 16/185 137/528 |
| 2013/0146157 A1* | 6/2013 | Hsiao | | G05D 16/0691 137/505.39 |
| 2013/0233406 A1* | 9/2013 | Askew | | G05D 7/0133 137/15.19 |
| 2013/0240770 A1* | 9/2013 | McCarty | | F16K 31/44 251/304 |
| 2013/0255791 A1* | 10/2013 | Nashery | | G05D 7/00 137/12 |
| 2013/0263930 A1* | 10/2013 | Shelly | | F16K 17/10 137/12 |
| 2013/0291954 A1* | 11/2013 | Young | | F16K 31/1262 137/15.23 |
| 2013/0312840 A1* | 11/2013 | Young | | F16K 31/1221 137/15.19 |
| 2013/0313451 A1* | 11/2013 | Young | | F16K 31/1262 251/61.4 |
| 2013/0341541 A1* | 12/2013 | Boticki | | F16K 31/082 251/65 |
| 2014/0014859 A1* | 1/2014 | McCarty | | F16K 27/08 251/61.4 |
| 2014/0083513 A1* | 3/2014 | Zhou | | G05D 16/0688 137/2 |
| 2014/0083519 A1* | 3/2014 | Fan | | G05D 16/0669 137/15.18 |
| 2014/0083528 A1* | 3/2014 | Mevius | | F16K 31/165 137/505 |
| 2014/0083530 A1* | 3/2014 | Fan | | G05D 16/0663 137/505.18 |
| 2014/0090717 A1* | 4/2014 | Mevius | | G05D 16/10 137/12 |
| 2014/0090724 A1* | 4/2014 | Mevius | | F16K 31/165 137/488 |
| 2014/0090726 A1* | 4/2014 | Hawkins | | G05D 16/0694 137/505.13 |
| 2014/0097364 A1* | 4/2014 | Young | | F16K 31/1262 251/61 |
| 2014/0138564 A1* | 5/2014 | Adams | | F15B 15/10 251/63.6 |

(56) References Cited

U.S. PATENT DOCUMENTS

| | | | | |
|---|---|---|---|---|
| 2014/0174565 | A1* | 6/2014 | Yunxia | F16K 17/04 137/505 |
| 2014/0183385 | A1* | 7/2014 | Adams | F15B 15/1438 251/128 |
| 2014/0261782 | A1* | 9/2014 | Vu | G05D 16/10 137/469 |
| 2014/0261787 | A1* | 9/2014 | Blanchard | G05D 16/0683 137/505 |
| 2015/0034178 | A1* | 2/2015 | Vasquez | F16K 17/04 137/471 |
| 2015/0059883 | A1* | 3/2015 | Jackle | G05D 16/063 137/536 |
| 2015/0129054 | A1* | 5/2015 | Simonsen | F15B 13/0426 137/486 |
| 2015/0159772 | A1* | 6/2015 | Kullen | F16K 31/1262 251/61.5 |
| 2015/0204456 | A1* | 7/2015 | Adams | F16K 31/1221 251/63.6 |
| 2015/0205306 | A1* | 7/2015 | Schmitz | G05D 16/103 137/505.41 |
| 2015/0212525 | A1* | 7/2015 | Bartha | G05D 16/0694 137/505.12 |
| 2015/0240463 | A1* | 8/2015 | Raule | F16K 17/048 137/14 |
| 2015/0240965 | A1* | 8/2015 | Arnold | F16K 31/163 251/58 |
| 2015/0240969 | A1* | 8/2015 | Lin | F16K 39/022 251/282 |
| 2015/0247582 | A1* | 9/2015 | Vasquez | F16K 15/021 137/540 |
| 2015/0300523 | A1* | 10/2015 | Huo | F16K 31/1264 137/492.5 |
| 2015/0316166 | A1* | 11/2015 | Crutsinger | F16K 31/1266 251/75 |
| 2015/0355642 | A1* | 12/2015 | Sanders | G05D 7/012 137/484.2 |
| 2015/0377381 | A1 | 12/2015 | King et al. | |
| 2016/0069475 | A1* | 3/2016 | Hein | F16K 37/0075 73/46 |
| 2016/0102765 | A1* | 4/2016 | McEvoy | F15B 15/10 137/15.18 |
| 2016/0123481 | A1* | 5/2016 | Aharoni | F16K 11/022 137/12 |
| 2016/0195190 | A1* | 7/2016 | Nguyen | F16K 3/246 251/285 |
| 2016/0274600 | A1* | 9/2016 | Yuzawa | F16K 7/12 |
| 2016/0290519 | A1* | 10/2016 | Burgett | F16K 17/02 |
| 2016/0312913 | A1* | 10/2016 | Thybo | F16K 31/1245 |
| 2016/0334809 | A1* | 11/2016 | Laurens | G05D 16/0655 |
| 2017/0009785 | A1* | 1/2017 | McEvoy | F15B 15/1404 |
| 2017/0016553 | A1* | 1/2017 | Volovec | F16K 31/128 |
| 2017/0016554 | A1* | 1/2017 | Volovec | F16K 31/128 |
| 2017/0030476 | A1* | 2/2017 | Taya | F16K 31/122 |
| 2017/0045149 | A1* | 2/2017 | Hielkema | F16K 15/185 |
| 2017/0068260 | A1* | 3/2017 | Jing | G05D 16/02 |
| 2017/0102721 | A1* | 4/2017 | Hunt | F16K 1/34 |
| 2017/0108881 | A1* | 4/2017 | Welch, II | G05D 16/0683 |
| 2017/0123439 | A1* | 5/2017 | Koenig | G05D 16/0402 |
| 2017/0211714 | A1* | 7/2017 | Lei | F16K 17/04 |
| 2017/0211720 | A1* | 7/2017 | Zhou | F16K 1/36 |
| 2017/0219111 | A1* | 8/2017 | Zhou | F16K 17/30 |
| 2017/0314701 | A1* | 11/2017 | Vulkan | B60K 15/03519 |
| 2017/0314703 | A1* | 11/2017 | Hoerschken | F16K 47/08 |
| 2017/0321819 | A1* | 11/2017 | Howell | F16K 1/2007 |
| 2018/0010620 | A1* | 1/2018 | Huh | F15B 15/10 |
| 2018/0058596 | A1* | 3/2018 | Hawkins | F16K 17/0413 |
| 2018/0090235 | A1* | 3/2018 | Ko | F16K 1/00 |
| 2018/0266576 | A1* | 9/2018 | Balet | F16K 15/066 |
| 2019/0032814 | A1* | 1/2019 | Zecchi | F16K 31/122 |
| 2019/0063470 | A1* | 2/2019 | Rohrig | F16K 31/126 |
| 2019/0086456 | A1* | 3/2019 | Mellinger | F16K 51/00 |
| 2019/0137001 | A1* | 5/2019 | Kirbs | F16K 41/02 |

FOREIGN PATENT DOCUMENTS

| | | |
|---|---|---|
| DE | 3637068 | 12/1987 |
| DE | 9300685 | 6/1993 |
| DE | 4428990 | 3/1995 |
| DE | 102010025635 | 1/2012 |
| EP | 0522285 | 1/1993 |
| EP | 3112733 | 1/2017 |

OTHER PUBLICATIONS

German Patent and Trademark Office, Search Report, dated April 27, 2018, p. 1-8, Application No. 202017104079.8, Applicant: Samson AG.

\* cited by examiner

ACTUATING DRIVE DEVICE PROCESS VALVES

The foreign priority of German patent application, Germany no. 20 2017 104 079.8, filed Jul. 17, 2017, is hereby incorporated herein by reference hereto.

The invention relates to an actuating device for process valves wherein the actuating device comprises a housing comprising two housing parts and a actuating membrane member sealingly mounted between the housing parts and moveable in strokes, which member, on the one hand, forms together with the housing a pressurizeable working chamber and, on the other end, is loaded by at least one return spring such that, in the unpressurized state, the actuating membrane member is brought into a predefined position by means of the pretension of the return spring wherein the actuating membrane member is adapted to be connected to a valve shaft connected to the valve body of the process valve, wherein a coupling installation is provided having coupling parts arranged on both sides in the direction of the lifting movement of the actuating membrane member which coupling parts are adapted to a connection on the valve shaft such that the connection of the valve shaft with the actuating membrane member is carried out by a one-sided mounting, wherein the valve shaft is adapted to be connected to each of the coupling parts of the coupling installation.

DE 44 28 990 A1 A shows to a pneumatic actuating drive device for control elements having a drive housing and a drive member movable therein on which a drive element for the actuation of the control element is fastened which member comes out of the drive housing and is movable with the drive member and which divides the drive housing into a pressure chamber and a restoring chamber provided with a vent opening and having a restoring element acting upon the drive member as well as having a fastening connection for a position controller from which a control-air feed passage as well as an exhaust-air passage are originating which leads into a transfer space wherein the drive housing is mounted reversibly such a way that, in a first mounting position, the pressure chamber and, in a second position, the restoring chamber are adjacent to the fastening connection, and wherein, furthermore, an air guiding channel extends through the drive element which air guiding channel, at the one hand, has an opening to the side of the drive element remote from the fastening connection into the chamber there and, on the other hand, has an opening leading to the transfer space, and wherein, furthermore, the air guiding channel is open to the transfer space in the first mounting position and the control-air feed passage leads directly to the pressure chamber, and wherein, finally, the exhaust-air passage has, in the second mounting position connection to the transfer space and to an exhaust-air opening of the position controller wherein a piston element is connected to drive element which piston element closes off the transfer space by means of a slide-ring seal. In this actuating drive device the complex structural construction is a disadvantage, and the reconstruction is correspondingly cumbersome.

Further state of the art relating to positioning valves in which the drive housing is reversibly mountable such that, in a first position, the pressure chamber and, in a second position, the restoring chamber is adjacent to the fastening connection, is disclosed in the publications DE 93 00 685 U1, EP 0 522 285 A1, DE 36 37 068 A1 and DE 10 2010 025 635 A1.

Therefore the invention is based on the object to provide an actuating drive device with an integrated distance measuring system having a compact and simplified structure wherein the actuating drive device may be mounted such that the security position of the valve is either an unpressurized open valve position or an unpressurized closed valve position, and in which the exchange of the security positions is possible with a few hand grips.

For this purpose, the actuating drive device of the invention is structured such that on the actuating device a distance measuring system is arranged, which comprises a connection which is adapted to be connected to each of the coupling parts of the coupling installation by means of a one-sided mounting, wherein the coupling parts are constructed in analogy to the corresponding connections for selectively fastening of the valve shaft or the distance measuring system to the coupling installation.

With this construction the valve shaft can be directly connected to the coupling part through the connection means which ensures a compact structure and a simple and fast mounting.

The distance measuring system that comprises the connection corresponding to the coupling installation and is adapted to be connected to both coupling parts can therefore selectively connected with the one or the other coupling part.

In this way the coupling part which is not used by the valves shaft can be used by the distance measuring system. This has the advantage that the distance measuring system can be integrated into the drive in a simple way.

This can be done always on the other connection of the coupling installation depending on the desired unpressurized position and can be reversed by the one-sided mounting possibility in a simple way.

In particular by such an arrangement of the coupling installation in the actuating device itself a compact pneumatic valve unit with a shortened yoke can be provided thereby that also the distance measuring system is directly integrated into the actuating device. The coupling of the valve shaft to the coupling system is done directly in the actuating device whereby a coupling between the actuating device and the valve shaft is dispensed with such that the yoke of the process valve may be kept shorter than in the state of the art which also contributes the compactness of the arrangement.

According to an advantageous embodiment of the invention a moved part of the distance measuring system is provided with a connection corresponding to the coupling part.

Furthermore, the coupling installation can be arranged concentrically to connection flanges which provide a passage through the housing parts to the membrane and on which the housing of the actuating device is supported. Since the coupling connections are arranged concentrically to the juxtaposed fastening flanges the changeover of the process valve from an unpressurized open to an unpressurized closed valve is possible without problems.

According to a further advantageous embodiment the inventive actuating device is characterized in that the juxtaposed connection flanges are configured such that either the distance measuring system or a yoke of the process valve are adapted to be connected which also simplifies the above mentioned changeover.

According to a further advantageous embodiment the inventive actuating device is characterized in that the actuating membrane member as well as a membrane plate of the actuating device is fixed between the coupling parts of the coupling installation which results in a secure central connection of the valve shaft to the actuating membrane member.

According to a further advantageous embodiment the inventive actuating device is characterized in that the first coupling part of the coupling installation comprises a first hub which is disposed on the one side of the membrane and is provided with an interior thread which is inserted on the side facing the membrane, and that the second coupling part of the coupling installation comprises a second hub which is threaded through a hole in the membrane with a threaded bolt into the interior thread of the first coupling part, wherein both sides of the membrane are fluidically separated in particular by means of a sealing ring with respect to the membrane.

The coupling parts may comprise an interior thread at the end facing away from the membrane for threading on the valve shaft or the distance measuring system respectively.

As an alterative a continuous hub may be inserted into membrane plate, wherein the gas-tightness required at the transition of the membrane plate is ensured for example by a seal which is compressed by threading in the connecting part of the valve shaft.

In the inventive actuating device a sensor housing of the distance measuring system is preferably arranged on the fastening flange on the outer side of the housing facing away from the yoke whereas, in a further embodiment, the valve shaft is guided on the fastening flange in the interior side facing the yoke of the housing of the actuating device wherein the fastening flanges are exchangeable, Therein, the valve shaft is sealed with respect to the housing.

Further advantages, features and application possibilities of the present invention appear from the following specification in connection with embodiments shown in the drawings.

In the specification, the claims and the drawings the terms used in the list of reference signs given below and related reference signs are used. In the drawings:

The Figures show pneumatic/fluidic one-way acting process valves 2, in particular actuating drive devices 4 for such process valves 2.

The process valves 2 shown in the Figures comprise an actuating drive device 4 and a valve housing 8 connected by a yoke 6 to the actuating drive device 4, the valve housing having an input 10 and an outlet 12 and a valve opening 14 which may be opened or closed by a valve body 16 which is actuated by a valve shaft 18 which is connected to the valve body 16 and the actuating drive device 4. The valve shaft 18 is directly connected to the actuating membrane member 20 of the actuating drive device 4 for this purpose.

The actuating drive device 4 shown in the Figures comprises a housing 22 out of two housing halves 24, 26. The actuating membrane member 20 which is sealed off to the interior of the housing and is movable in strokes forms, at the one hand, with the housing 22 a pressurizeable working chamber 28 and a space 30 for at least one return spring 32 which acts against a pressure application on the actuating membrane member 20. The actuating member 20 comprises a membrane 34 and a membrane plate 36 on which the return spring 32 is supported.

Figure 1:
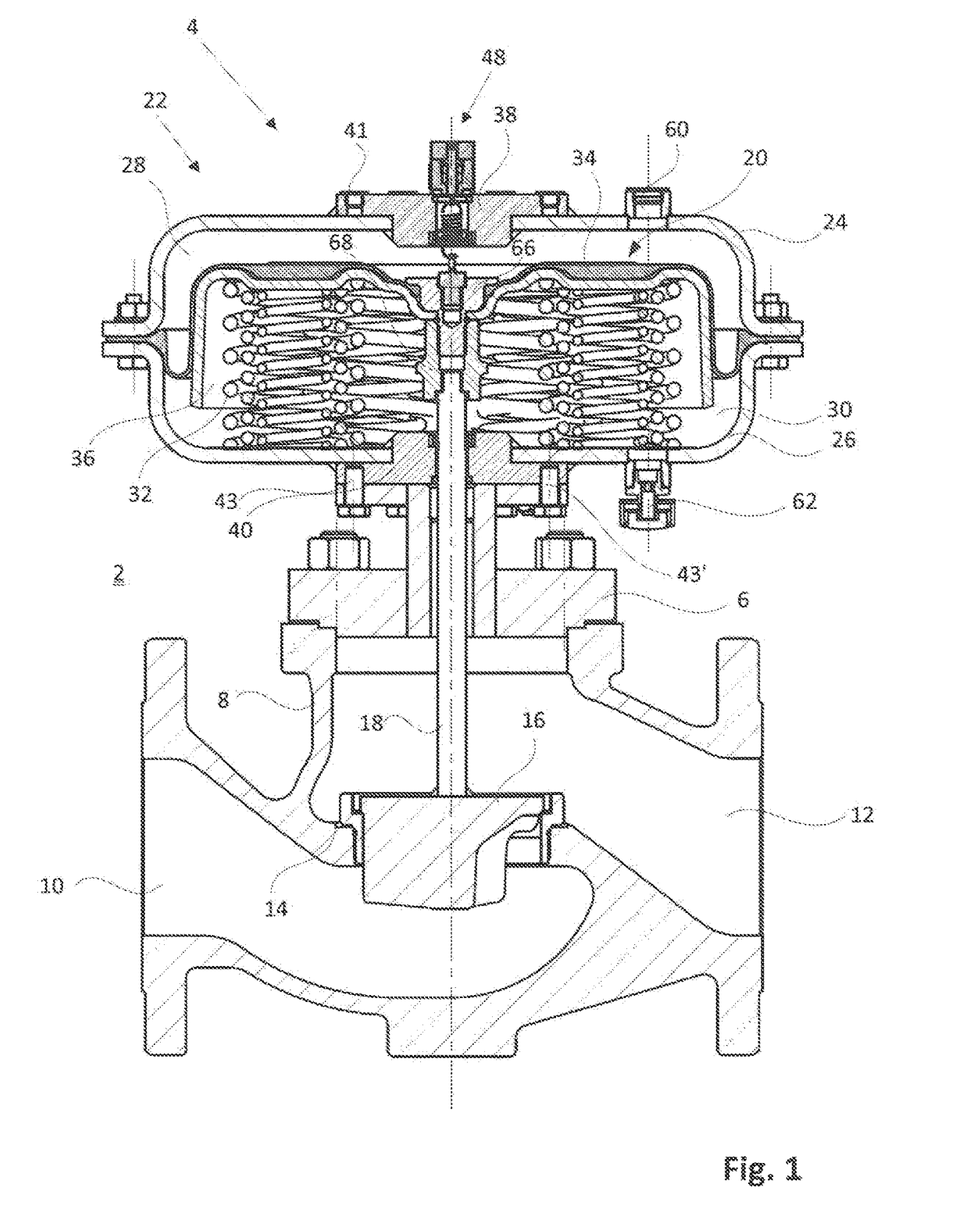
FIG. 1 is a section view of an unpressurized open process valve.

On the housing halves 24, 26 of the housing 22 juxtaposed fastening flanges 38, 40 centrally arranged on the housing halves 24, 25 are fastened by weld connections 42 in the case of the fastening flange 38 and by weld connections 44 in the case of the fastening flange 40. On the fastening flange 38 blank plugs 41, 41" are arranged where the corresponding bores have no function when the fastening flange 38 is located on the outside of the actuating drive device 4 as shown in FIG. 1. The fastening flange 40 is connected by bolts 43, 43" to the yoke 6, wherein the bolts 43, 43" are reaching into bores in the fastening flange 40 as shown in FIG. 1.

Figure 2:
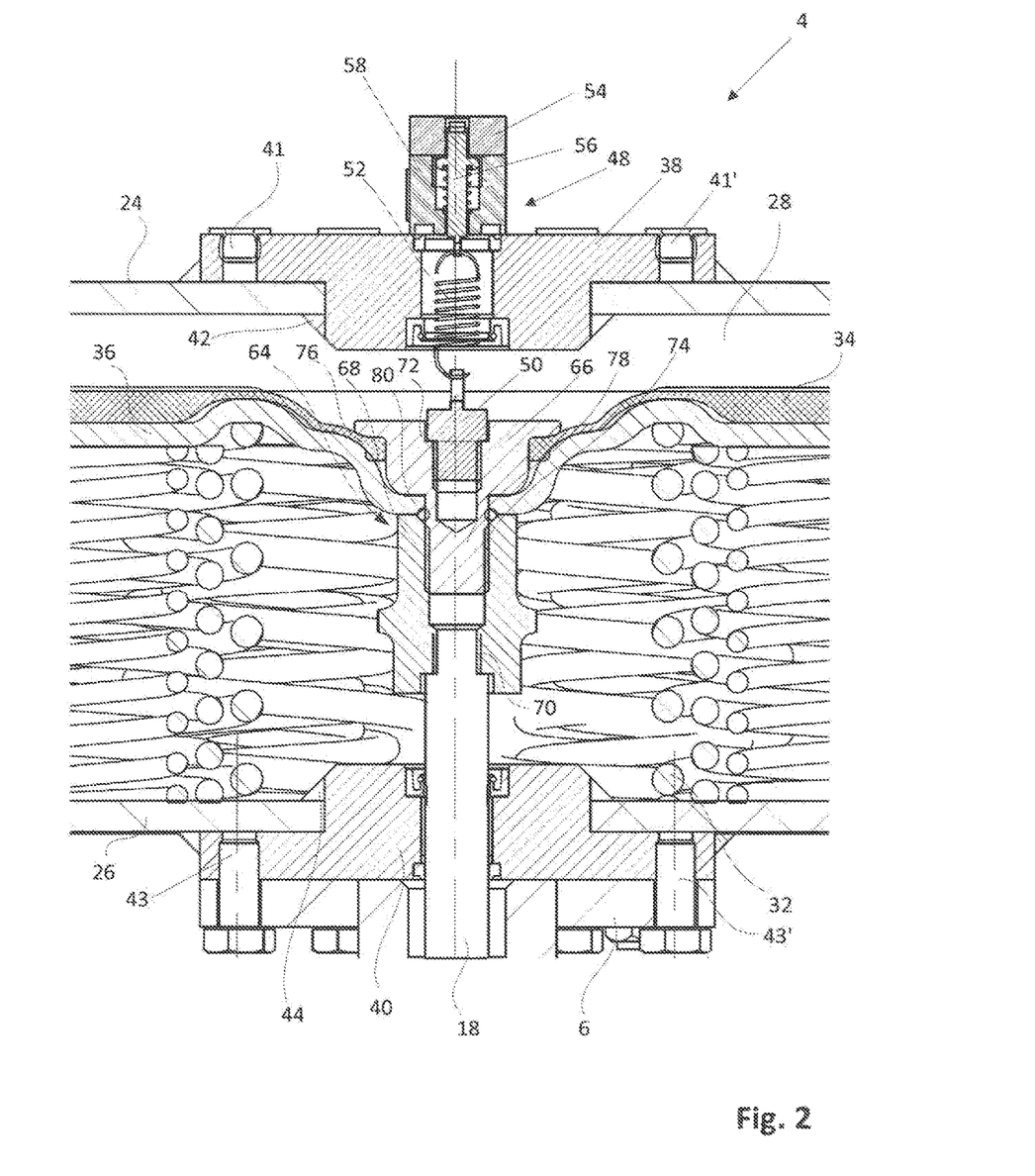
FIG. 2 is an enlarged section view of the unpressurized open process valve of FIG. 1.

On the actuating drive device 4, furthermore, a distance measuring system 48 is arranged which, according to FIG. 2, consists of a moved part 50 connected to the actuating membrane member 20, a spring 52 connected to the moved part 50, a core 56 connected to the spring 52, longitudinally shiftably supported in a sensor housing 54 pre-tensioned opposite to the spring 52 and a Hall-sensor 58 cooperating with the core 56. The distance measuring system 48 can also be an inductive or capacitive measuring system or the like. With this distance measuring system 48 a movement of the actuating member 20 and, thereby, the movement of the valve body 16 can by measured. The sensor housing 54 of the distance measuring system 48 is arranged on the fastening flange 38 on the outside of the valve housing 8 facing away from the yoke 6 according to FIGS. 1 and 2

According to FIGS. 1 and 2, the actuating membrane member 20 is brought in the unpressurized state by means of the pre-tension of the return spring 32 into a position which is the unpressurized open position of the process valve 2. For this purpose the working chamber 28 which is located according to FIG. 1 at the top in the actuating drive device 4, is vented through a connection stub 60, and the space 30 for the return spring 32 which according to FIG. 1 is located at the bottom in the actuating drive device 4 is kept unpressurized through a connection stub 62.

Figure 3:
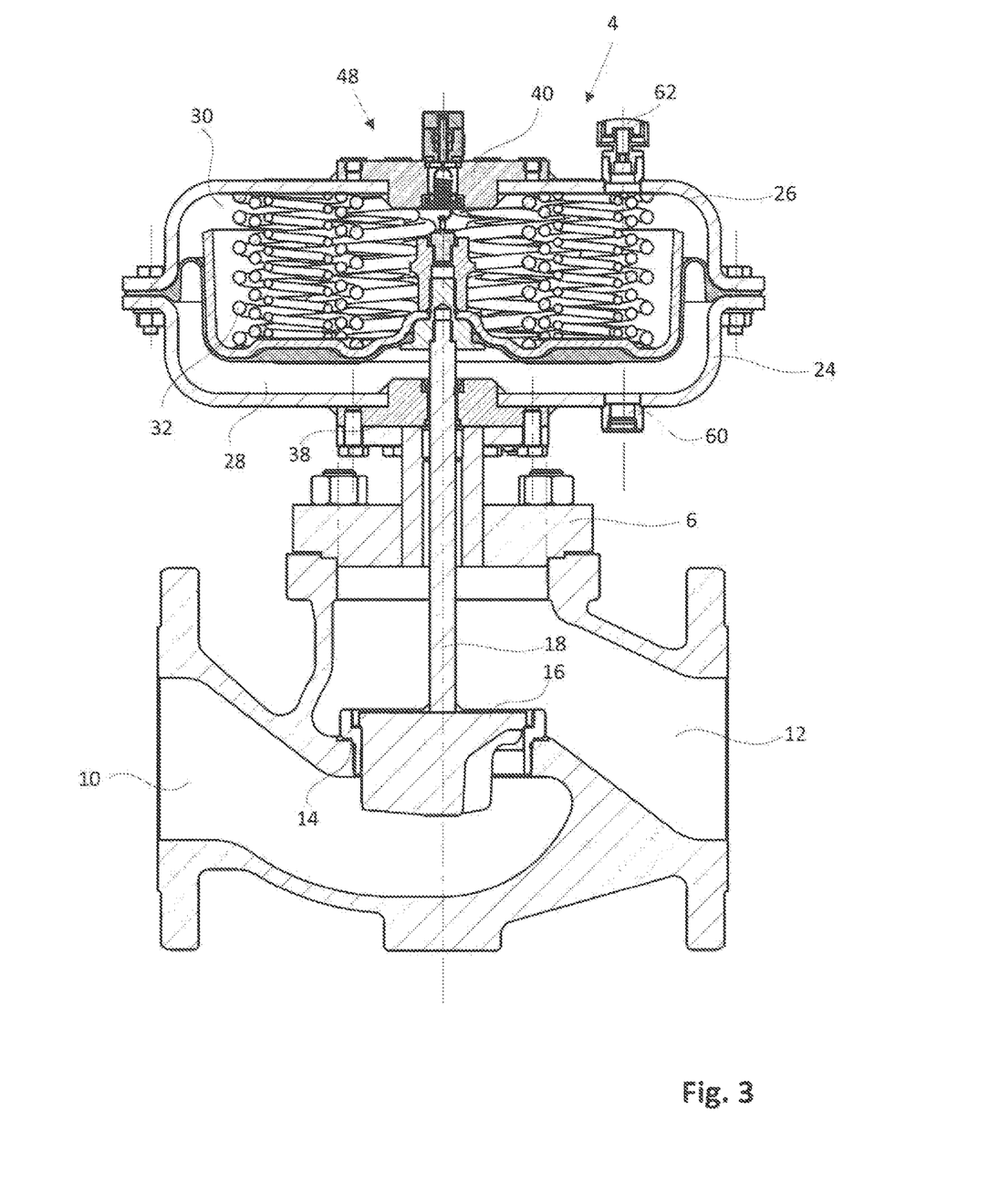
FIG. 3 is a section view of an unpressurized closed process valve.
Figure 4:
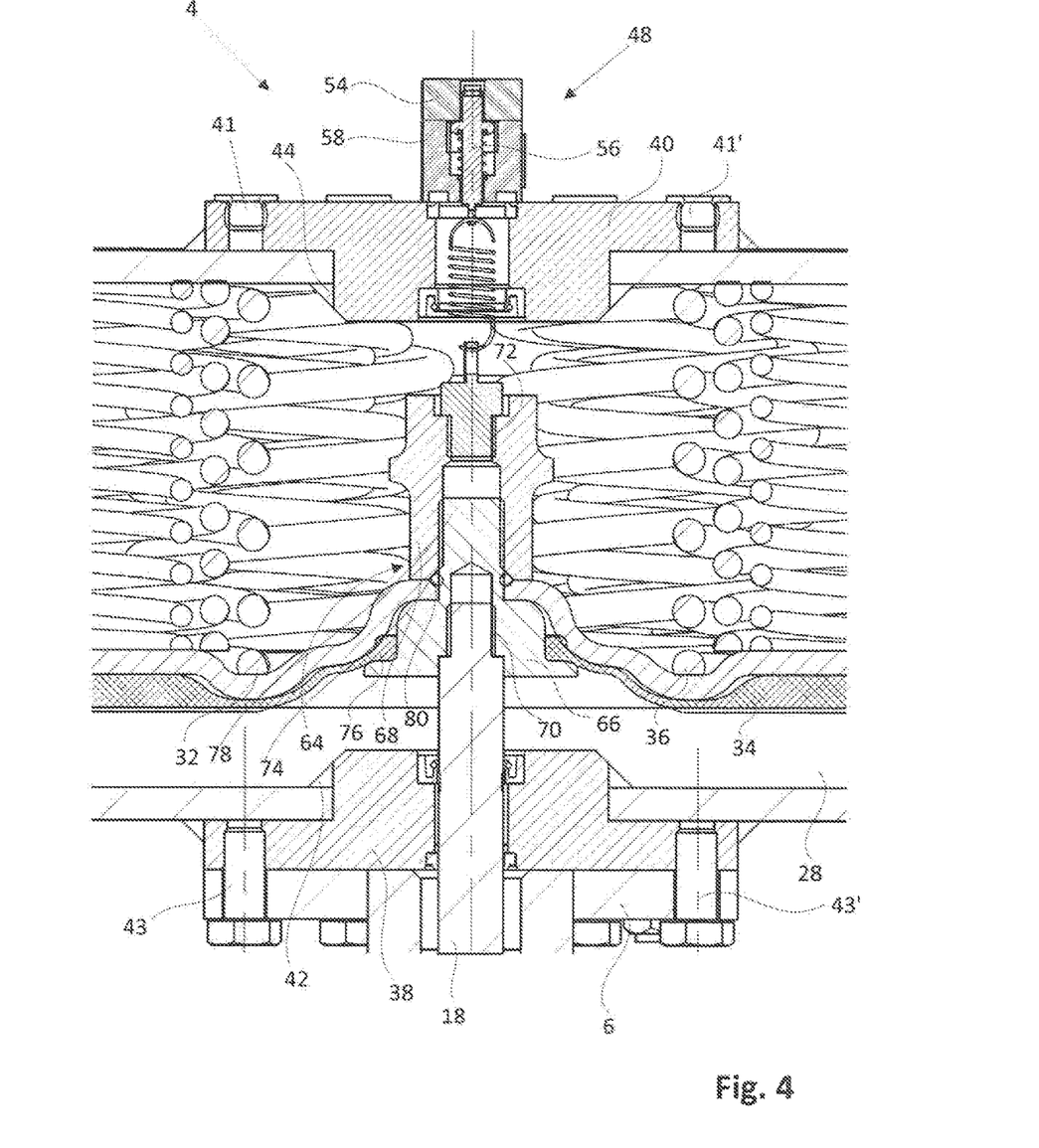
FIG. 4 is an enlarged section view of the unpressurized closed process valve of FIG. 3.

According to FIGS. 3 and 4 the actuating membrane member 20 in the unpressurized state is brought by means of the pre-tension of the return spring 32 into the unpressurized closed position of the process valve 2. For this purpose the working chamber 28 located at the bottom in the actuating drive device 4 is pressurized according to FIG. 3 through the connection stub 60, and the space 30 for the return spring 32 located at the bottom in the actuating drive device 4 according to FIG. 3 is kept unpressurized or vented by means of the connection stub 62.

For coupling the valve shaft 18 and the distance measuring system 48 to the actuating drive device 4 a coupling installation 64 with coupling parts 66, 68 is provided which are provided with mutually corresponding connections 70, 72 for connecting the coupling installation 64, on the one hand, to the valve shaft 18 and, on the other hand, to the moved part 50 of the distance measuring system 48 where either the valve shaft 18 or the distance measuring system 48 are selectively connectable through a connection 70, 72 each to the coupling installation 64. The membrane 34 of the actuating membrane member 20 and the membrane plate 36 of the actuating membrane member 20 are fixed between the coupling parts 66, 68 of the coupling installation 64.

In the actuating drive device 4 according to FIGS. 2 and 4 the first coupling part 68 of the coupling installation 64 comprises a first hub which is located on the one side of the membrane 34 and is provided with an interior thread 74 which is placed on the side facing the membrane 34. The second coupling part 66 of the coupling installation 64 comprises a second hub which is threaded with a threaded bolt into the interior thread 74 of the first coupling part 68 through a hole 76 in the membrane whereby the two sides of the membrane 34 are fluidically separated in particular by means of a sealing ring 80.

According to the FIGS. 1 and 2 the moved part 50 of the distance measuring system 48 is thread-connected to the coupling part 66 arranged in the working chamber 28, and the valve shaft 18 is thread-connected to the coupling part 68 arranged in the space 30 for the return spring 32. According to the FIGS. 3 and 4 the moved part 50 of the distance measuring system 48 is thread-connected to the coupling part 68 which is arranged in the space 30 for the return spring 32 and the valve shaft 18 is thread-connected with the coupling part 66 arranged in the working chamber 28.

The connections 70, 72 for connection to the coupling installation 64 for selectively fixing the valve shaft 8 or the distance measuring system 48 are arranged symmetrically to the juxtaposed fastening flanges 38, 40 which are fixed to the housing halves 24, 26 of the housing 22 by weld connections 42 and 44 respectively. The juxtaposed fastening flanges 38, 40 are configured such that either of the distance measuring system 48 or the yoke 6 of the process valve is to be connected.

In the described process valves 2 the following steps are necessary for exchanging the security position of the one-way operating actuating drive device 4 from an unpressurized open position into an unpressurized closed position starting from the position of FIG. 1: At first the distance measuring system 48 is removed from the fastening flange. Thereafter, the moved part 50 of the distance measuring system 48 is threaded off the coupling part 66. Next, the fastening flange 40 in which the valve shaft 18 was supported is threaded off by loosening the bolts 43, 43' whereby the actuating drive device 4 may be lifted off, and the valve shaft 18 can be threaded off the coupling part 68.

Thereafter, the actuating drive device 4 is turned by 180° such that the fastening flange 40 will be located on top and the fastening flange 38 will be located below in the actuating drive device 4. The new mounting starts again thereby that the valve shaft 18 is mounted on the other side of the actuating drive device 4 through the fastening flange 38 on the coupling part 66. Next, the distance measuring system 48 is mounted on the fastening flange 40 and the moved part 50 of the distance measuring system is threaded into the coupling part 68. Thereafter, the fastening flange 38 through which the valve shaft 18 is guided, is screwed on where after changeover is finished.

LIST OF REFERENCE NUMERALS 2 process valve
4 actuating drive device
6 yoke
8 valve housing
10 inlet
12 outlet
14 valve opening
16 valve body
18 valve shaft
20 actuating membrane element
22 housing
24 housing halve
26 housing halve
28 operating chamber
30 space
32 return spring
34 membrane
36 membrane plate
38 connection flange
40 connection flange
41, 41" blank plug
42 weld connection
43, 43" bolt
44 weld connection
48 distance measuring system
50 moved part
52 spring
54 sensor housing
56 core
58 Hall-sensor
60 connection stub
62 connection stub
64 coupling installation
66 coupling part
68 coupling part
70 connection
72 connection
74 interior thread
76 hole
78 threaded bolt
80 sealing ring

The invention claimed is:

1. Actuating device for a process valve, comprising:
a housing;
said housing includes a first housing part and a second housing part;
said housing further includes an actuating membrane member sealingly mounted between said first and said second housing parts;
said actuating membrane member forms together with said housing a pressurizeable working chamber;
said actuating membrane member in an unpressurized state is brought into a predefined position by pretension of said at least one return spring;
said actuating membrane member is connected to a valve shaft;
said valve shaft is connected to a valve body of said process valve;
a coupling including a first coupling part and a second coupling part, said first and second coupling parts are interconnected with said actuating membrane member;
said first and second coupling parts are connected to said valve shaft and a moved part;
a distance measuring system comprising: a sensor housing, a sensor, a core and a tension spring; said tension spring operating between said core of said sensor and said moved part; and, said sensor selected from the group consisting of a Hall sensor, an inductive sensor and a capacitive sensor.

2. Actuating device according to claim 1, further comprising:
said actuating membrane member as well as a membrane plate are fixed between said first and second coupling parts.

3. Actuating device according to claim 1, wherein said core is pre-tensioned opposite to said tension spring.

4. Actuating device according to claim 1, wherein said core is longitudinally shiftably supported in said sensor housing.

* * * * *

UNITED STATES PATENT AND TRADEMARK OFFICE
CERTIFICATE OF CORRECTION

PATENT NO. : 10,488,872 B2
APPLICATION NO. : 16/024884
DATED : November 26, 2019
INVENTOR(S) : Koinke Page 1 of 1

It is certified that error appears in the above-identified patent and that said Letters Patent is hereby corrected as shown below:

In the Specification

Column 1, Line 9, after "housing parts and" delete "a" and insert -- an -- therefor.

Column 4, Line 4, after "plugs" delete "41,41′′′" and insert -- 41,41′ -- therefor.

Column 4, Line 8, after the first occurrence of "bolts" delete "43, 43′′′" and insert -- 43,43′ -- therefor.

Column 4, Line 8, after the second occurrence of "bolts" delete "43,43′′′" and insert -- 43,43′ -- therefor.

Column 6, Line 5, before "bank plug" delete "41,41′′′" and insert -- 41,41′ --.

Column 6, Line 7, before "bolt" delete "43,43′′′" and insert -- 43,43′ -- therefor.

Signed and Sealed this
Seventh Day of April, 2020

Andrei Iancu
*Director of the United States Patent and Trademark Office*